US012186605B2

(12) United States Patent
Jimenez

(10) Patent No.: US 12,186,605 B2
(45) Date of Patent: *Jan. 7, 2025

(54) LONG-THROW FIRE PROTECTION SPRINKLER

(71) Applicant: The Reliable Automatic Sprinkler Co. Inc., Liberty, SC (US)

(72) Inventor: Juan Jimenez, Liberty, SC (US)

(73) Assignee: The Reliable Automatic Sprinkler Co. Inc., Liberty, SC (US)

(*) Notice: Subject to any disclaimer, the term of this patent is extended or adjusted under 35 U.S.C. 154(b) by 483 days.

This patent is subject to a terminal disclaimer.

(21) Appl. No.: 17/537,552

(22) Filed: Nov. 30, 2021

(65) Prior Publication Data

US 2022/0080238 A1 Mar. 17, 2022

Related U.S. Application Data

(63) Continuation of application No. 16/077,148, filed as application No. PCT/US2017/021878 on Mar. 10, 2017, now Pat. No. 11,219,790.

(Continued)

(51) Int. Cl.

| | |
|---|---|
| ***A62C 31/02*** | (2006.01) |
| ***A62C 37/11*** | (2006.01) |
| ***B05B 1/26*** | (2006.01) |

(52) U.S. Cl.

CPC .............. *A62C 31/02* (2013.01); *A62C 37/11* (2013.01); *B05B 1/265* (2013.01)

(58) Field of Classification Search

CPC ...................................................... B05B 1/265

See application file for complete search history.

(56) References Cited

U.S. PATENT DOCUMENTS 2,135,138 A * 11/1938 Kendall .................. B05B 1/265 239/DIG. 1
4,280,562 A 7/1981 Glinecke
(Continued)

OTHER PUBLICATIONS

Notification of Transmittal of the International Search Report and the Written Opinion of the International Searching Authority, or the Declaration, the International Search Report and the Written Opinion, dated Aug. 2, 2017, issued in corresponding International Patent Application No. PCT/US2017/21878.

(Continued)

*Primary Examiner* — Joseph A Greenlund
(74) *Attorney, Agent, or Firm* — Venable LLP

(57) ABSTRACT

A pendent fire protection sprinkler includes a sprinkler body having an inlet and an outlet that define a fluid passage and a sprinkler axis, and a pair of frame arms that form a junction. A deflector, mounted to the junction, includes an annular, planar central portion extending along a plane that is perpendicular to the sprinkler axis, as well as a first portion, a second portion, a third portion, and a fourth portion, each portion extending outwardly from the planar central portion. Each of the first and second portions has a rounded outermost peripheral edge. Each of the third and fourth portions has first, second, and third rectilinear outermost peripheral edges, a respective second rectilinear outermost peripheral edge being located between respective first and third rectilinear outermost peripheral edges, and the first and third rectilinear outermost peripheral edges being obtusely angled relative to the respective second rectilinear outermost edge.

20 Claims, 5 Drawing Sheets

Related U.S. Application Data

(60) Provisional application No. 62/307,162, filed on Mar. 11, 2016.

(56) References Cited

U.S. PATENT DOCUMENTS

| | | | | |
|---|---|---|---|---|
| 5,839,667 | A * | 11/1998 | Fishcer | A62C 31/02<br>169/37 |
| 6,276,460 | B1 * | 8/2001 | Pahila | B05B 1/265<br>239/524 |
| 6,446,732 | B1 * | 9/2002 | Polan | B05B 1/265<br>169/57 |
| 6,854,668 | B2 * | 2/2005 | Wancho | A62C 37/14<br>239/524 |
| 7,343,980 | B2 * | 3/2008 | Pahila | A62C 37/11<br>169/41 |
| 9,717,937 | B2 * | 8/2017 | Miller | A62C 35/68 |
| 11,219,790 | B2 * | 1/2022 | Jimenez | A62C 31/02 |
| 11,439,857 | B2 * | 9/2022 | Dibble | B05B 1/267 |
| 11,865,388 | B2 * | 1/2024 | Dibble | A62C 37/12 |
| 2011/0180277 | A1 * | 7/2011 | Jimenez | A62C 37/11<br>169/37 |
| 2013/0043050 | A1 * | 2/2013 | Barmoav | A62C 31/02<br>169/37 |
| 2015/0122513 | A1 * | 5/2015 | Miller | A62C 35/62<br>169/37 |
| 2019/0022442 | A1 * | 1/2019 | Jimenez | A62C 37/08 |

OTHER PUBLICATIONS

International Preliminary Report on Patentability, dated Mar. 1, 2018, issued in corresponding International Patent Application No. PCT/US2017/21878.

"Standard for the Installation of Sprinkler Systems," National Fire Protection Association, 2012, pp. 1-100, Chapter 8, Quincy, Massachusetts.

* cited by examiner

LONG-THROW FIRE PROTECTION SPRINKLER

CROSS REFERENCE TO RELATED APPLICATIONS

Claim of Priority

This application is a continuation of U.S. patent application Ser. No. 16/077,148, filed Aug. 10, 2018, now U.S. Pat. No. 11,219,790, issued Jan. 11, 2022, which is a U.S. national stage application of International Patent Application No. PCT/US2017/021878, filed Mar. 10, 2017, which claims priority from U.S. Provisional Patent Application No. 62/307,162, filed Mar. 11, 2016, each of which is incorporated by reference herein.

FIELD OF THE INVENTION

The invention relates to long-throw pendent fire protection sprinklers, and to deflectors included in long-throw pendent fire protection sprinklers for use in fire protection.

DESCRIPTION OF RELATED ART

Pendent fire protection sprinklers are provided in ceilings to provide fire protection, and are designed to provide a specified amount of fluid to a specified area as a function of time. The specified area, known as the coverage area, is limited in maximum length by the capability of the pendent fire protection sprinkler to deliver the fluid to the perimeter of the coverage area. As the maximum length of the coverage area increases, a portion of the fluid output by the pendent fire protection sprinkler must have a higher velocity moving away from the sprinkler to reach the perimeter of the coverage area. This can be achieved by increasing the velocity of the fluid as it passes through an output orifice of the pendent fire protection sprinkler by, for example, increasing the fluid pressure in the supply piping. Increasing the fluid pressure in the supply piping, however, may require installation of relatively larger supply piping or a fire pump.

The Standard for the Installation of Sprinkler Systems, as set forth in the 2013 Edition published by the National Fire Protection Association, Inc., (NFPA 13), requires that pendent fire protection sprinklers providing extended coverage have a maximum spacing of 20 feet (6.096 meters). NFPA 13 § 8.8.2.1.2. Specialty upright fire protection sprinklers have been designed for specific applications, such as attics, with lengths of coverage areas of the specialty upright fire protection sprinklers exceeding 20 feet (6.096 meters). These specialty upright fire protection sprinklers must be installed a minimum of 16 inches (406.4 mm) below a peak (ceiling peak), and are installed under sloped roof decks. These specialty upright fire protection sprinklers cannot, however, be mounted close to the ceiling, or recessed therein, while maintaining a large length of coverage.

Horizontal sidewall fire protection sprinklers are also used to provide fire protection for coverage areas having large coverage lengths. Section 8.7.4.1.2.2 of the NFPA 13 requires that horizontal sidewall fire protection sprinklers be installed on a sidewall at least 4 inches (101.6 mm) below the ceiling. The position of the horizontal sidewall fire protection sprinkler below the ceiling is significant because droplets of the fluid discharged from the horizontal sidewall fire protection sprinkler are pulled towards the floor by gravity, and, in order to increase the coverage length of the coverage area for a horizontal sidewall fire protection sprinkler, a portion of the fluid sprayed from the horizontal sidewall fire protection sprinkler needs to be directed in an initially upward trajectory. This arrangement allows the fluid to travel farther horizontally from the horizontal sidewall fire protection sprinkler, because the amount of time between the output of the fluid from the horizontal sidewall fire protection sprinkler orifice to the fluid reaching the floor is relatively longer. Section 8.7.4.1.1.1 NFPA 13 requires that horizontal sidewall fire protection sprinklers have a minimum deflector to ceiling distance of 4 inches (101.6 mm), so that the fluid can be projected in an initially steep upward trajectory without striking the ceiling. Alternatively, vertical sidewall fire protection sprinklers may be installed in a pendent or an upright position while mounted on a sidewall. As provided in Tables 8.7.2.2.2 of NFPA 13, coverage areas for such fire protection sprinklers are limited to 14 feet by 14 feet (196 $ft^2$) (4.26 meters by 4.26 meters) (18.21 square meters). Further, section 8.7.4.1 of NFPA 13 requires that vertical sidewall fire protection sprinklers have a minimum deflector to ceiling distance of 4 inches (101.6 mm), that allows the fluid to be projected with an initially steep upward trajectory similar to a horizontal sidewall fire protection sprinkler, unlike a ceiling-mounted pendent fire protection sprinkler.

SUMMARY OF THE INVENTION

An objective of the present invention is to provide a pendent fire protection sprinkler that overcomes the disadvantages discussed above.

To accomplish this objective, in one embodiment, a pendent fire protection sprinkler comprises a sprinkler body having an inlet at an inlet end, and an outlet at an outlet end, the inlet and the outlet defining a fluid passage and a sprinkler axis, a pair of frame arms that project downwardly from the outlet end of the sprinkler body that meet at a distance from the outlet end of the sprinkler body to form a junction, a plug that seals the fluid passage, a thermally responsive element provided between the plug and the junction and configured to maintain the plug in the passage prior to actuation of the pendent fire protection sprinkler, and a deflector mounted to the junction. The deflector comprises a planar central portion extending outward from the sprinkler axis along a plane that is perpendicular to the sprinkler axis, a first angled portion extending outward from the planar central portion in a first direction that is perpendicular to the sprinkler axis, and a second angled portion extending outward from the planar central portion in a second direction that is perpendicular to the sprinkler axis, and collinear with and opposite to the first direction. The deflector also comprises a third angled portion extending outward from the planar central portion in a third direction that is perpendicular to the sprinkler axis, the first direction, and the second direction, and a fourth angled portion extending outward from a planar central portion in a fourth direction that is perpendicular to the sprinkler axis, and collinear with and opposite to the third direction. The first, second, third, and fourth angled portions are bent away from the frame arms in the outlet direction from the plane of the planar central portion.

In another embodiment, a pendent fire protection sprinkler arrangement is configured to be installed in a ceiling, and comprises at least one pendent fire protection sprinkler comprising a sprinkler body having an inlet at an inlet end, an outlet at an outlet end, the inlet and the outlet defining a fluid passage and a sprinkler axis, and threads for connection to sprinkler system piping, wherein, when the pendent fire protection sprinkler is installed in the ceiling, the outlet end is within two inches of a surface of the ceiling. The pendent fire protection sprinkler further comprises a pair of frame arms that project downwardly from the outlet end of the sprinkler body and meet at a distance from the outlet end of the sprinkler body to form a junction, a plug that seals the fluid passage, a thermally responsive element provided between the plug and the junction for retaining the plug in the fluid passage, and a deflector mounted to the junction. The deflector comprises a planar central portion extending outward from the sprinkler axis along a plane that is perpendicular to the sprinkler axis, a first angled portion extending outward from the planar central portion in a first direction that is perpendicular to the sprinkler axis, and a second angled portion extending outward from the planar central portion in a second direction that is perpendicular to the sprinkler axis, and collinear with and opposite to the first direction. The deflector also comprises a third angled portion extending outward from the planar central portion in a third direction that is perpendicular to the sprinkler axis, the first direction, and the second direction, and a fourth angled portion extending outward from a planar central portion in a fourth direction that is perpendicular to the sprinkler axis, and collinear with and opposite to the third direction. The first, second, third, and fourth angled portions are bent away from the frame arms in the outlet direction from the plane of the planar central portion, and the at least one pendent fire protection sprinkler has a rectangular coverage area comprising a length along a long axis and a width along a short axis, the long axis and the short axis being perpendicular to each other, and the length being from 20 feet up to 35 feet.

DETAILED DESCRIPTION OF THE PREFERRED EMBODIMENTS

Figure 1:
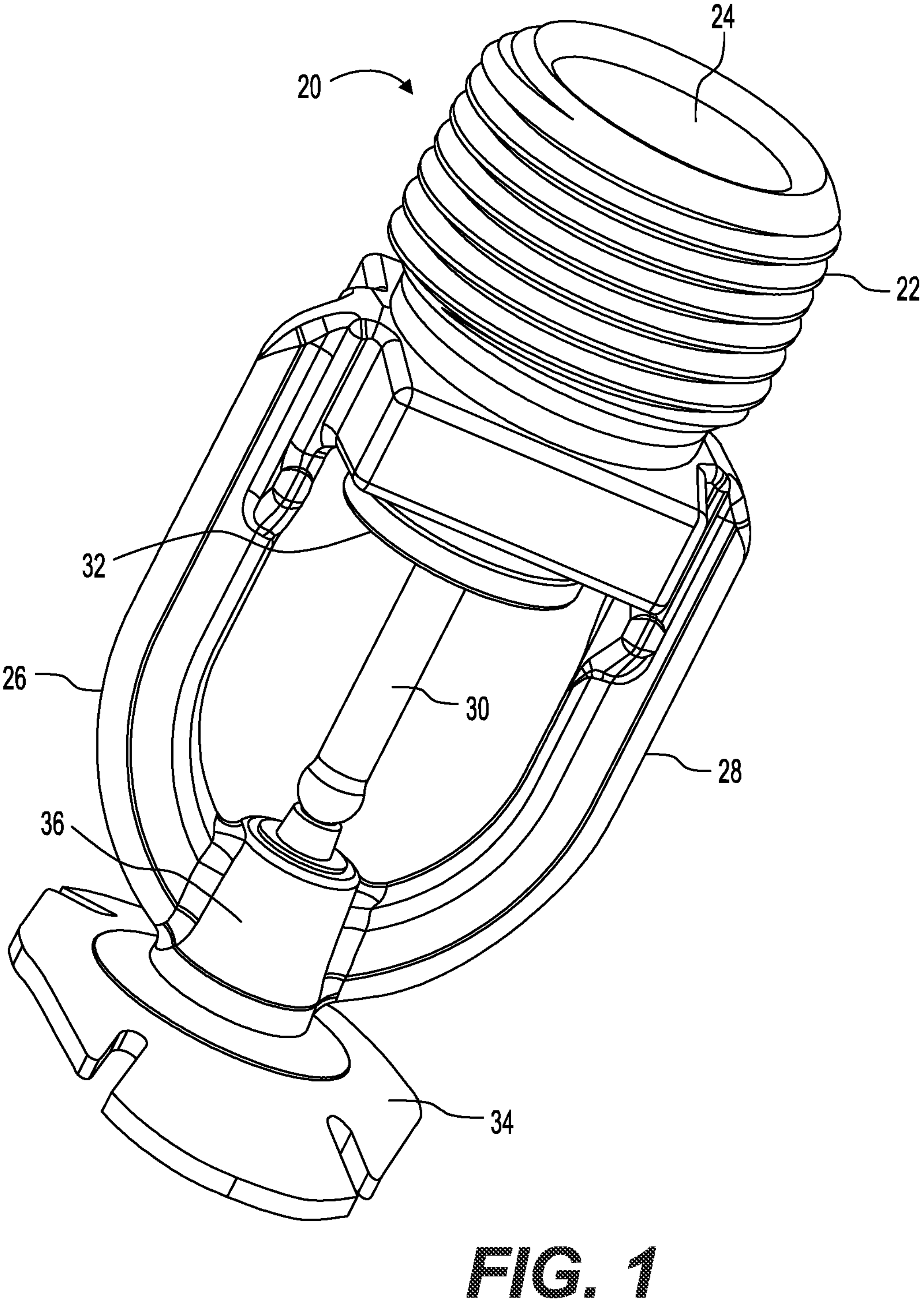
FIG. 1 is an isometric view of a pendent fire protection sprinkler in accordance with an embodiment of the invention.
Figure 2:
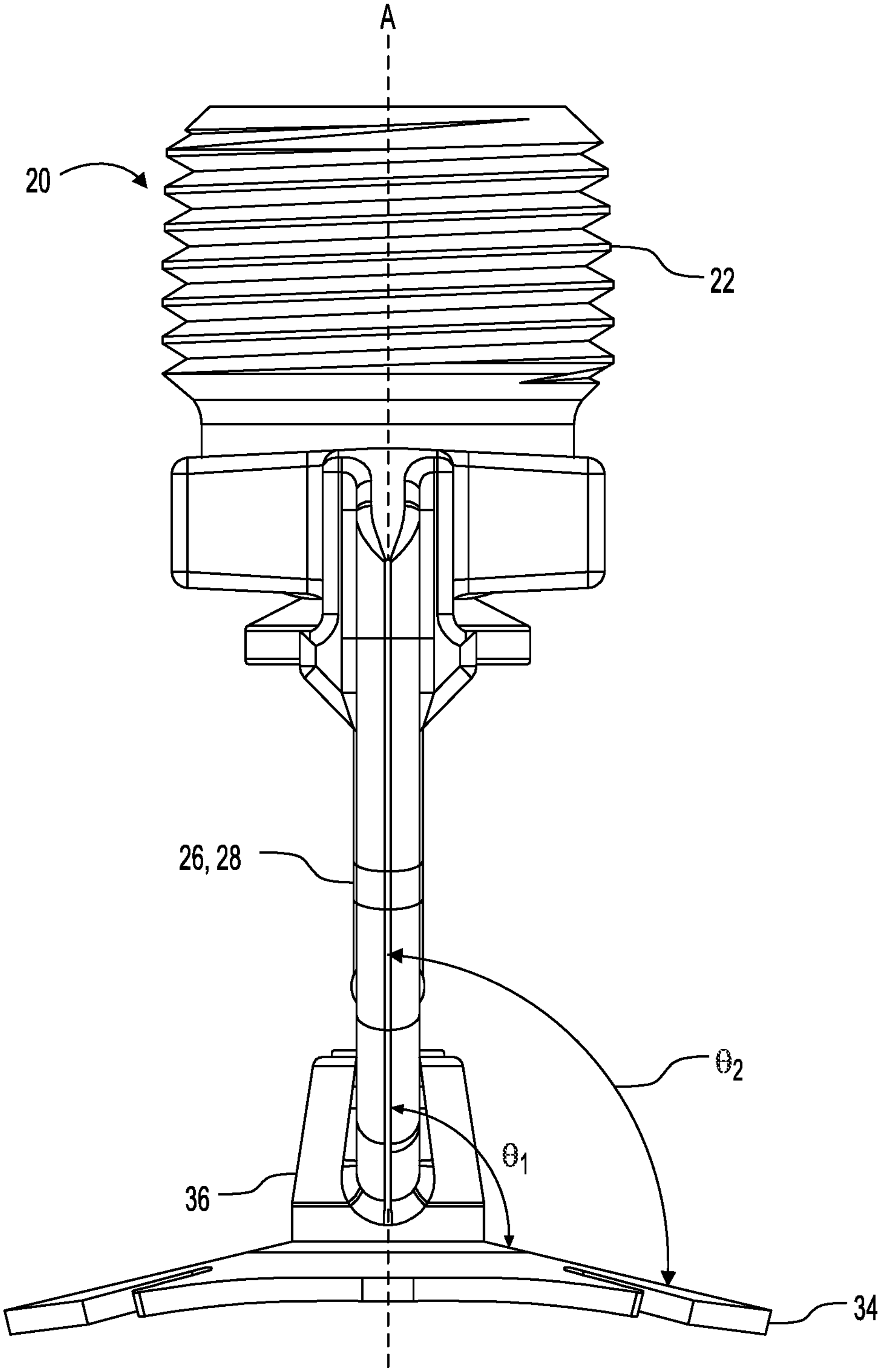
FIG. 2 is a side view of a pendent fire protection sprinkler in accordance with an embodiment of the invention.

FIGS. 1 and 2 show one embodiment of a pendent fire protection sprinkler 20 of the invention. The pendent fire protection sprinkler 20 includes a sprinkler body 22 having an inlet at an inlet end, an outlet (not shown) at an outlet end, and a fluid passage 24 for the fluid. A sprinkler axis A extends along the fluid passage 24. The inlet end of the pendent fire protection sprinkler 20 has threads for connection to piping of a sprinkler system, and the fluid passage 24 extends from the inlet end to the outlet end. When the pendent fire protection sprinkler 20 is installed in a ceiling, the outlet end is located within 2 inches (50.8 mm) of the ceiling. One or more frame arms 26, 28 project downward from the sprinkler body 22, e.g., on either side of the sprinkler axis A. If more than one frame arm 26, 28 is provided, the plurality of frame arms 26, 28 may form a junction 36 at their respective lower ends (i.e., the outlet end of the pendent fire protection sprinkler 20). A plug 32 seals the fluid passage 24 in the sprinkler body 22, and a thermally responsive element 30 is provided between the plug 32 and the junction 36. The thermally responsive element 30 holds the plug 32 in place, sealing the orifice of the fluid passage 24 until actuation of the pendent fire protection sprinkler 20. A deflector 34 is mountable to the junction 36 at the end of the one or more frame arms 26, 28, at an opening 38 in the deflector 34.

Figure 3:
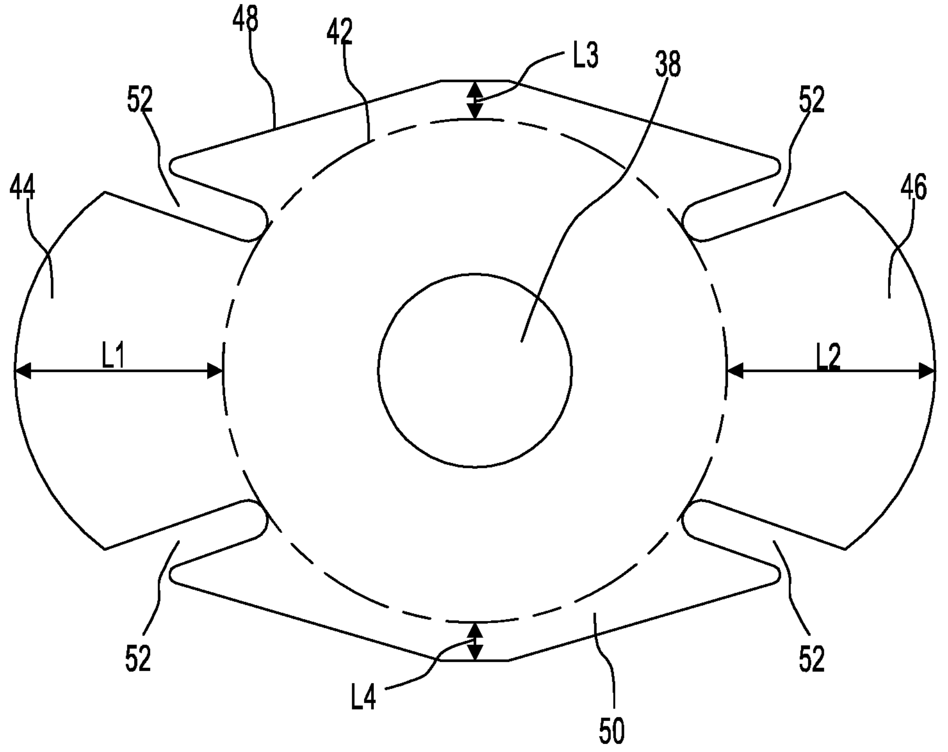
FIG. 3 is a top view of a deflector of a pendent fire protection sprinkler in accordance with an embodiment of the invention.

The deflector 34 is arranged to direct fluid in a generally horizontal direction when the pendent fire protection sprinkler 20 is mounted in the ceiling. That is, for the purpose of directing fluid in a generally horizontal direction, the deflector 34 has a central portion 42 that extends outward from the sprinkler axis A, generally along a plane perpendicular to the sprinkler axis A. In a typical embodiment, the central portion 42 may be bent relative to the sprinkler axis A at a first angle $\theta_1$. The deflector 34 also includes at least one outer angled portion 44, 46, 48, 50 that extends from an outer peripheral edge of the central portion 42 at a second angle $\theta_2$ that is greater than the first angle $\theta_1$ with respect to the sprinkler axis A. The outer angled portion includes a first angled portion 44 extending outward from the peripheral edge of the central portion 42, at the second angle $\theta_2$ from the sprinkler axis A, in a first direction, and has a length L1, as shown in FIG. 3. A second angled portion 46 extends outward from the peripheral edge of the central portion 42, at the second angle $\theta_2$ from the sprinkler axis A, in a second direction, and has a length L2. The first and second directions may be opposite to each other with respect to the sprinkler axis A. In addition, a third angled portion 48 may be provided on the outer angled portion, extending outward from the peripheral edge of the central portion 42 in a third direction, and has a length L3. A fourth angled portion 50 extends outward from the peripheral edge of the central portion 42, in a fourth direction, and has a length L4. The third and fourth directions may be opposite to each other with respect to the sprinkler axis A. That is, the first and second angled portions 44, 46 are provided on opposing sides of the central portion 42 with respect to the sprinkler axis A, and produce the length of the rectangular coverage area of the installed pendent fire protection sprinkler 20, and the third and fourth angled portions are provided on opposing sides of the central portion 42 with respect to the sprinkler axis A, and produce the width of the rectangular coverage area of the installed pendent fire protection sprinkler 20.

Figure 4:
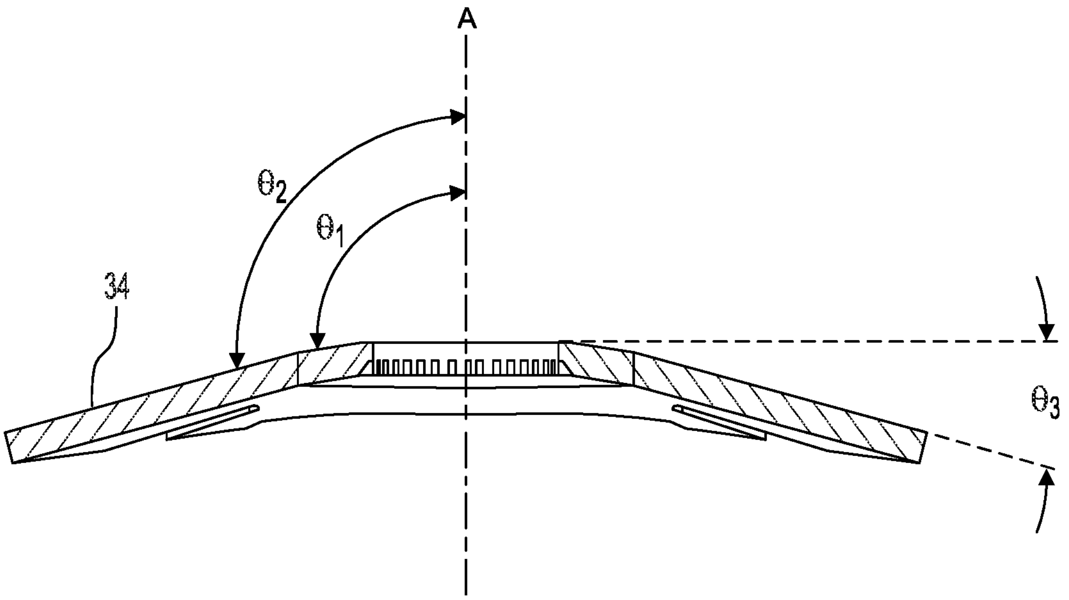
FIG. 4 is a cross-sectional side view of a deflector of a pendent fire protection sprinkler in accordance with an embodiment of the invention.
Figure 5:
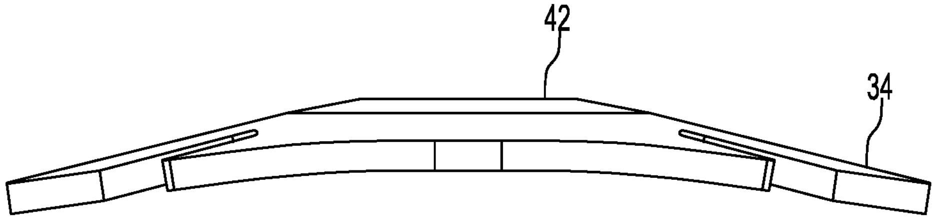
FIG. 5 is a side view of a deflector of a pendent fire protection sprinkler in accordance with an embodiment of the invention.

As shown in FIG. 2, each of the first angled portion 44, the second angled portion 46, the third angled portion 48, and the fourth angled portion 50 may be bent at the second angle $\theta_2$ from the sprinkler axis A, in a downward direction (i.e., in the output direction). The second angle $\theta_2$ is preferably at least 104° relative to the sprinkler axis A. Alternatively, as shown in FIG. 4, the first to fourth angled portions 44, 46, 48, and 50 may be bent at an angle $\theta_3$ relative to a horizontal plane that is perpendicular to the sprinkler axis A, with $\theta_3$ being approximately 14°. This angle may ordinarily be the same for the first to fourth angled portions 44, 46, 48, and 50, although it is within the broader scope of the invention for the first to fourth angled portions 44, 46, 48, and 50 to be bent at two, three, or four different angles. As noted above, and as shown in FIG. 3, the first angled portion 44 and the second angled portion 46 may be symmetrical to each other with respect to the sprinkler axis A, and the third angled portion 48 and the fourth angled portion 50 may be symmetrical to each other with respect to the sprinkler axis A.

In a typical embodiment, the combination of the lengths L1 and L2, representing the length of the first angled portion 44 and the second angled portion 46 of the deflector 34, is 1.46 inches (37.08 mm) (L1 and L2 may each be half of that combined length, or 0.72 inch (18.54 mm) as measured from the sprinkler axis A), and the combination of the lengths L3 and L4 representing the width of the deflector 34 is 0.92 inch (23.37 mm) (L3 and L4 may each be half of that combined length, or 0.46 inch (11.68 mm) as measured from the sprinkler axis A). The opening 38 of the deflector 34 may have a diameter of 0.306 inch (7.77 mm), and the central portion 42 may have a diameter of 0.567 inch (14.40 mm). The lengths L1 and L2 are measured generally along a long axis L of the deflector 34, and the lengths L3 and L4 are measured generally along a short axis S of the deflector 34. In a typical embodiment, a width of the coverage area along the short axis S is less than a length of the coverage area along the long axis L. For example, the width of the coverage area along the short axis S is 14 feet (4.27 m), and the length of the coverage area along the long axis L is 28 feet (8.53 m).

Spaces, or slots, 52 are provided between adjacent angled portions 44, 46, 48, and 50, as shown in FIG. 3. The width of the slot 52 between a side edge of the first angled portion 44 and an adjacent side edge of either one of the third angled portion 48 and fourth angled portion 50 may be 0.06 inch (1.52 mm). Similarly, the width of the slot 52 between a side edge of the second angled portion 46 and a side edge of either one of the adjacent third angled portion 48 or fourth angled portion 50 may also be 0.06 inch (1.52 mm). The slots 52 allow some of the fluid that flows out of the fluid passage 24 to flow downward (i.e., along the outlet direction), in addition to the fluid being deflected horizontally by the deflector 34. While the slots 52 are generally oriented radially with respect to the sprinkler axis A, the slots 52 do not lie precisely along a radius of the central portion 42 of the deflector 34, and instead, an axis of each slot 52 is offset from the radius of the central portion 42. That is, the axes of opposing slots 52 are not collinear, and instead are parallel to each other and offset from each other by a distance of, e.g., 0.20 inch (5.08 mm), and are offset an equal distance from a diametric line that passes through the sprinkler axis A. In addition, in another embodiment, the first and second angled portions 44, 46 may have a rounded peripheral edge, while the third and fourth angled portions 48, 50 may have a peripheral edge that is rectilinear, with one or more straight edge portions, as shown in FIG. 3.

In a preferred embodiment, a portion of the pendent fire protection sprinkler 20 is mounted in the ceiling so that a minimum distance between the deflector 34 and the ceiling is 1 inch (25.4 mm). Alternatively, the pendent fire protection sprinkler 20 may be mounted in a recess in the ceiling, such that a minimum distance between the deflector 34 and the ceiling is 0.75 inch (19.05 mm). The pendent fire protection sprinklers 20 having the structure disclosed herein may be spaced over 20 feet (6.10 m) apart, up to 28 feet (8.53 m) apart, and water distribution that meets the requirements set forth in NFPA 13 can be obtained over a 392 square foot (36.42 $m^2$) area.

The pendent fire protection sprinkler 20 may have a K-factor in the range of 3 $gpm/(psi)^{1/2}$ to 30 $gpm/(psi)^{1/2}$, the K-factor being defined as $$K = \frac{Q}{\sqrt{p}},$$

where W is the flow rate from the outlet of the pendent fire protection sprinkler 20 in gallons per minute, and p is the residual pressure at the inlet of the pendent fire protection sprinkler 20 in pounds per square inch. More particularly, the pendent fire protection sprinkler 20 may have a K-factor in the range of 5.6 $gpm/(psi)^{1/2}$ to 14.8 $gpm/(psi)^{1/2}$, and most preferably, the pendent fire protection sprinkler 20 may have a K-factor of 5.6 $gpm/(psi)^{1/2}$.

As noted above, each pendent fire protection sprinkler 20 that may be used in a pendant sprinkler arrangement, as described above, has a rectangular coverage area comprising the long axis L and the short axis S. The long axis L is perpendicular to the short axis S, and the long axis L may extend from 20 to 35 feet (6.10 to 10.67 m).

While the present invention has been described with respect to what are, at present, considered to be the preferred embodiments, it is to be understood that the invention is not limited to the disclosed embodiments. To the contrary, the invention is intended to cover various modifications and equivalent arrangements included within the spirit and scope of the appended claims.

The invention claimed is:

1. A pendent fire protection sprinkler comprising:

(A) a sprinkler body having an inlet at an inlet end, and an outlet at an outlet end, the sprinkler body defining a fluid passage and a sprinkler axis extending from the inlet to the outlet;

(B) a pair of frame arms that project from the inlet end toward the outlet end of the sprinkler body in an outlet direction, and meet at a distance from the outlet end of the sprinkler body to form a junction; and (C) a deflector mounted to the junction, the deflector comprising:

(a) an annular, planar central portion extending outward from the sprinkler axis along a plane that is at an angle to the sprinkler axis, the annular, planar central portion having a constant inner radius and a constant outer radius;

(b) a first portion extending directly outward by a length L1 from the constant outer radius of the annular, planar central portion in a first direction that is at an angle to the sprinkler axis;

(c) a second portion extending directly outward by a length L2 from the constant outer radius of the annular, planar central portion in a second direction that is at an angle to the sprinkler axis;

(d) a third portion extending directly outward by a length L3 from the constant outer radius of the annular, planar central portion in a third direction that is at an angle to the sprinkler axis;

(e) a fourth portion extending directly outward by a length L4 from the constant outer radius of the annular, planar central portion in a fourth direction that is at an angle to the sprinkler axis; and (f) a first slot between the first portion and the portion, a second slot between the first portion and the fourth portion, a third slot between the second portion and the third portion, and a fourth slot between the second portion and the fourth portion, wherein (i) the length L1 is equal to the length L2, (ii) the length L3 is equal to the length L4, and (iii) the length L1 is greater than the length L3, such that the first and second portions are symmetrical to each other with respect to the sprinkler axis, and the third and fourth portions are symmetrical to each other with respect to the sprinkler axis, wherein each of the first and second portions has a rounded outermost peripheral edge, and wherein each of the third and fourth portions has first, second, and third rectilinear outermost peripheral edges, a respective second rectilinear outermost peripheral edge being located between respective first and third rectilinear outermost peripheral edges, and the first and third rectilinear outermost peripheral edges being obtusely angled relative to the respective second rectilinear outermost peripheral edge on either side of the respective second rectilinear outermost peripheral edge.

2. The pendent fire protection sprinkler according to claim 1, wherein the first, second, third, and fourth portions are bent away from the frame arms in a downward direction from the plane of the annular, planar central portion.

3. The pendent fire protection sprinkler according to claim 2, wherein the first, second, third, and fourth portions are bent away from the frame arms in the downward direction from the plane of the sprinkler axis at an angle of at least 104°.

4. The pendent fire protection sprinkler according to claim 1, wherein an axis of each slot is offset from a radius of the annular, planar central portion.

5. The pendent fire protection sprinkler according to claim 4, wherein opposing slots are offset from each other.

6. The pendent fire protection sprinkler according to claim 1, wherein the lengths L1 and L2 are measured along a long axis L of the deflector.

7. The pendent fire protection sprinkler according to claim 6, wherein the lengths L3 and L4 are measured along a short axis S of the deflector.

8. The pendent fire protection sprinkler according to claim 7, wherein a width of the coverage area along the short axis S is less than a length of the coverage area along the long axis L.

9. The pendent fire protection sprinkler according to claim 1, wherein the lengths L3 and L4 are measured along a short axis S of the deflector.

10. The pendent fire protection sprinkler according to claim 9, wherein a width of the coverage area along the short axis S is less than a length of the coverage area along the long axis L.

11. The pendent fire protection sprinkler according to claim 1, further comprising (D) a plug that seals the fluid passage until actuation of the sprinkler.

12. The pendent fire protection sprinkler according to claim 11, further comprising (E) a thermally responsive element provided between the plug and the junction, the thermally responsive portion holding the plug in place until actuation of the sprinkler.

13. The pendent fire protection sprinkler according to claim 1, further comprising (D) a thermally responsive element that holds a plug in place.

14. The pendent fire protection sprinkler according to claim 13, wherein the plug seals the fluid passage until actuation of the sprinkler.

15. The pendent fire protection sprinkler according to claim 14, wherein the sprinkler, when actuated, has a rectangular coverage area comprising a length along a long axis and a width along a short axis, the long axis and the short axis being perpendicular to each other.

16. The pendent fire protection sprinkler according to claim 1, wherein the annular, planar central portion extends outward from the sprinkler axis along a plane that is at a first angle to the sprinkler axis.

17. The pendent fire protection sprinkler according to claim 16, wherein the first, second, third, and fourth portions are bent away from the frame arms in a downward direction from the plane of the sprinkler axis at a second angle.

18. The pendent fire protection sprinkler according to claim 17, wherein the second angle is greater than the first angle.

19. The pendent fire protection sprinkler according to claim 17, wherein the first, second, third, and fourth portions are bent away from the frame arms in the downward direction from the plane of the sprinkler axis at an angle of at least 104°.

20. The pendent fire protection sprinkler according to claim 19, wherein the second angle is greater than the first angle.

* * * * *